UNITED STATES PATENT OFFICE.

CHRISTIAN SHUNK, OF PHILADELPHIA, PENNSYLVANIA.

IMPROVEMENT IN REFINING IRON.

Specification forming part of Letters Patent No. 14,257, dated February 12, 1856; Reissue No. 1,686, dated May 31, 1864; Reissue No. 2,118, dated November 28, 1865; Reissue No. 3,036, dated July 14, 1868.

*To all whom it may concern:*

Be it known that I, CHRISTIAN SHUNK, formerly of Youngstown, Ohio, but now residing in Philadelphia, in the State of Pennsylvania, have discovered and invented a new and useful improvement in the manufacture, refining, and decarbonizing or partially decarbonizing molten crude pig iron by the employment and application of an air-blast forced into the molten metal, which has the effect of refining and decarbonizing the same in a greater or lesser degree, depending upon the time the blast is continued, and preparing it to be molded into ingots or other forms of iron or steel fit for the hammer or the rolls; or the said refined metal can be molded at once into castings, where strength is required over common cast-iron. This refined metal is equal to malleable bar-iron to use in the "crucible process" for the manufacture of fine cast-steel, and can be taken in a molten state direct into the crucibles for this purpose; or it can be employed in a cold state, to be reconverted into fine cast-steel in crucibles.

In this process I use a compound consisting of common salt and manganese, which may be of various proportions, though I prefer about equal parts of each. This compound has the effect of a flux and detergent in removing the sulphur and other impurities contained in the crude metal. It also improves the quality of the iron, as hereinafter shown. It can be employed in the manufacture of the crude metal, or it can be added to the same when afterward remelted. From one to two per cent. of the flux at a time is sufficient. It may be that attempts have been made to use one or the other of said ingredients in some form in the manufacture of iron, but never, to my knowledge, with any practical results anterior to my application for the same in the year 1854. When the refined metal is intended to be molded into castings, the carbon is less reduced than when it is to be wrought under the hammer. The metal thereby remains fluid a longer time while being poured into the molds.

This application is grounded on my application and papers filed in the Patent Office on the 28th day of August, 1854, and on which a patent was subsequently issued for a part only of said application—the salt flux—and dated the 12th day of February, 1856, and on which a reissue was granted on an amended specification and renewed petition and statement, filed on oath bearing date the 31st day of May, 1864, and covering and embracing my original application of August, 1854, for refining and decarbonizing molten iron by the employment of an air-blast; and said Letters Patent have again been reissued on the 2[illegible]th day of November, 1865.

In the construction of the smelting-furnace it is preferable to form a wide top or tunnel head of the furnace-stack. It thereby affords a better calcination and preparation of the ores before they descend to the smelting-point below in the stack.

No. 1 pig-iron, with a large crystallization, and a lively gray cast in the fracture of the metal, is well adapted for refining, and contains six or seven per cent. of carbon taken up from the fuel employed in smelting the ores. Other grades of gray pig metal can also be employed; but the proportion of carbon is less than the former kind. The process of converting the metal by uniting the same with an atmospheric air-blast forced in is effected by the carbon of the crude iron, and thereby refined into iron or steel.

Refined iron, with a given portion of carbon, forms steel of different grades, according to the amount of carbon contained—from about two to one per cent., and in some kinds even less, as the semi-steel; and the refined iron ingots have also a smaller proportion of carbon, which gives it the commercial value of iron. The carbon contained in crude pig metal is mixed uncombined, and during the refining process with an air-blast the condition of the carbon becomes changed into a combined state, and the metal is converted into steel or iron refined. The metal is taken or run from the furnace-hearth into any properly-constructed apparatus of sufficient capacity and height to contain the quantity of metal to be refined, and made so as to allow room for the metal to rise while the blast is being forced in and ebullition is going on.

The form of the apparatus and the materials of which it is composed, so that it may resist the effect of the high heat to which it is to be subjected, need not be described, as they are well known to all those skilled in the art.

Ordinary fire-clay will not stand the intense heat created by the effect of the air-blast on the molten metal. This refining apparatus is not confined to any one particular mode of construction. One mode is to tap the converted metal in the side near the bottom by removing a fire-plug stopper. A properly-arranged gate or valve can be attached for this purpose.

The introduction of the air-blast into the refining apparatus can be effected in various ways to accomplish the decarbonizing and refining of the metal. One way is to attach the pipes or apertures on one side to force the air through into the metal. I prefer placing them in a tangential position. The force of the incoming blast will thereby cause the liquid metal to move round or rotate in the same direction with the blast, in pursuance of the plan patented by me May 17, 1859, and more fully shown in my reissued patent of February 10, 1863. They should be introduced at about half the depth of the metal in a downward direction.

To refine and decarbonize one ton of metal, I generally use a pair of pipes to force the air through, each eleven-eighths of an inch in diameter. These will discharge the required volume of air for one ton of metal with sufficient rapidity when the proper amount of pressure is applied; or the number of pipes or apertures can be increased and made of proportionate size for the volume and pressure of the air required.

To convert a ton of crude metal will require about one thousand cubic feet of air discharged per minute under a proper pressure on the square inch to effect a uniting of the air with the molten iron. The pressure of blast required will be about five pounds; but this will depend somewhat on the mode of introducing the air, and also on the size of the pipes employed and the column of metal above the same. A number of tons at a charge is refined in less time in proportion than a single ton; and in all cases, after the operation is finished, the refined metal should be allowed to stand some minutes to become calm before pouring.

When preparations are made, the process consists in starting an air-blast under a high pressure into the molten metal. The oxygen of the air unites freely with the carbon of the crude iron, forming carbonic gas and increased heat and the discharge of flame. An intense heat throughout the mass will be produced, and a violent ebullition takes place, with an increased volume of bright flame. The flame after some minutes' time decreases as the process goes on and the carbon is being reduced. During the refining operation the color of the flame passes through various changes, by which, with the reduced flame, will indicate to an experienced workman the quality of the product and the time to stop off the blast, so as to obtain the proper degree of carbonized metal converted into steel, semi-steel, or iron. When the carbon is all or nearly all out, the flame ceases, and the product will be refined malleable iron, with only a small proportion of carbon remaining, and prepared for pouring into the ingot-molds.

The fusing-point of pig metal is about 2,400° of Fahrenheit. Manganese requires a much higher heat, and when the oxide of that metal is used it has first to be reduced to its metallic state, which requires a higher heat still. It is therefore very difficult to incorporate iron and manganese by mere ordinary fusion; but by the "pneumatic" process the heat of the molten iron is raised to 4,000° or 5,000°, and sometimes higher, so that it becomes nearly as liquid as water. The oxide of manganese which is intermingled with the metal becomes thoroughly reduced, and the metal becomes incorporated with the molten iron throughout, thus producing a metal greatly improved in quality over other irons, and adding much to the value of the refining process above described.

Having described how the refining is accomplished in a refining apparatus, I will state how it may be done in the furnace-hearth, the former being preferable.

The tuyere-pipes employed to force the air through are introduced at one of the tuyere-arches, or in front, under the temp-stone E, through an aperture in the dam-plate G, and of sufficient length to dip down into the metal to discharge the blast. The refining pipes or apertures to force the air through are made of black-lead, or of pure soapstone, or of any material that will resist the heat.

The pneumatic process for converting crude iron by the use of an air-blast is a process of expansion of the crude iron in a highly-heated condition, which cannot be attained by any other mode of manufacture. All the particles of the molten metal become extended in a very high degree of heat and fluidity, thereby liberating all the scoria, and a purely-refined homogeneous metal of iron or steel is obtained, possessing great tenacity and tensile strength of character.

In the construction of my refining or converting apparatus I do not confine myself to any one form or details of the same, nor to any one mode of introducing the blast, so as to effect the refining and decarbonizing of the metal.

The mode of melting pig-iron in a "refinery fire" with the use of fuel to maintain the heat, and continuing the use of the same while preparing the metal for the "puddling" furnace, in the manufacture of bar-iron, has long been known.

Having described my discovery or invention, what I ask for in Letters Patent is—

1. The refining and decarbonizing of molten crude iron by the employment of an atmospheric air-blast uniting the oxygen of the air with the carbon of the crude metal, and thereby decarbonizing or partially decarbonizing and refining the same, thus preparing it to be molded into ingots or otherwise of iron or steel fit for the hammer or the rolls, or to be molded into castings, or to be reconverted into fine cast-steel.

2. I do not claim, broadly, the alloying of manganese and iron, as that has before been done; but I claim such alloying when effected by the introduction of the oxide of manganese, as above described, by which the ore is not only reduced, but the metal is thoroughly fused and incorporated with the iron through the instrumentality of the high heat produced by the air-blast, in the manner above shown.

3. The use of a compound consisting of common salt and manganese as a flux and detergent in said process, as set forth.

CHRISTIAN SHUNK

Witnesses:

JULIUS HIRSCH,
J. V. CAMPBELL.